(12) United States Patent
Lloyd et al.

(10) Patent No.: US 10,663,666 B2
(45) Date of Patent: May 26, 2020

(54) FLEXIBLE, LOW PROFILE KINK RESISTANT FIBER OPTIC SPLICE TENSION SLEEVE

(71) Applicants: Jeffrey M. Lloyd, San Diego, CA (US); Brandon J. Wiedemeier, San Diego, CA (US)

(72) Inventors: Jeffrey M. Lloyd, San Diego, CA (US); Brandon J. Wiedemeier, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 1031 days.

(21) Appl. No.: 14/098,027

(22) Filed: Dec. 5, 2013

(65) Prior Publication Data

US 2015/0160415 A1     Jun. 11, 2015

(51) Int. Cl.
| | |
|---|---|
| *G02B 6/255* | (2006.01) |
| *G02B 6/44* | (2006.01) |
| *B29L 11/00* | (2006.01) |

(52) U.S. Cl.
CPC ..... *G02B 6/2558* (2013.01); *B29L 2011/0075* (2013.01); *G02B 6/4433* (2013.01)

(58) Field of Classification Search
None
See application file for complete search history.

(56) References Cited

U.S. PATENT DOCUMENTS

| | | | |
|---|---|---|---|
| 4,545,645 | A | 10/1985 | Mignien |
| 4,722,588 | A | 2/1988 | Priaroggia |
| 4,812,010 | A * | 3/1989 | Osaka et al. ............ 385/96 |

(Continued)

FOREIGN PATENT DOCUMENTS

| | | |
|---|---|---|
| WO | WO-1997012268 A1 | 4/1997 |
| WO | WO-1998048308 A1 | 10/1998 |

OTHER PUBLICATIONS

"Harsh Environment Fiber Cable Repair Kit", Oct. 2012, http://www.timbercon.com/assets/Uploads/fiber-optic-cable-repair-kits/Harsh-Env.-Fiber-Cable-repair-kit.pdf.

(Continued)

*Primary Examiner* — Andrew Jordan
(74) *Attorney, Agent, or Firm* — Naval Information Warfare Center, Pacific; Kyle Eppele; Arthur K. Samora

(57) ABSTRACT

This invention is a method and system for addressing structural weaknesses and geometric differentials introduced to a cable when splicing optic fibers. The apparatus and method utilize structurally integrated layers of protective polymers and bonding materials selected for strength and flexibility relative to their thickness. This results in an apparatus having a minimally increased circumference compared to the cable. The method and apparatus include one or more strengthening layers which allow the repaired cable substantially similar flexibility compared to the cable, but prevent formation of sharp bends or kinks. The strengthening layers also allow the repaired cable a resistance to tension similar to the original cable. The method and apparatus further include an outer layer having a geometric configuration which includes sloped terminating ends designed to prevent the reinforced area of the cable from being damaged by the force of objects or substances in contact with cable.

2 Claims, 4 Drawing Sheets

(56) References Cited

U.S. PATENT DOCUMENTS

| | | | |
|---|---|---|---|
| 4,824,198 A | 4/1989 | Anderton | |
| 5,037,177 A * | 8/1991 | Brown et al. | 385/59 |
| 5,121,458 A * | 6/1992 | Nilsson et al. | 385/100 |
| 5,125,057 A * | 6/1992 | Aberson et al. | 385/65 |
| 5,315,682 A * | 5/1994 | Daguet et al. | 385/95 |
| 5,754,724 A * | 5/1998 | Peterson et al. | 385/135 |
| 5,884,003 A | 3/1999 | Cloud et al. | |
| 6,099,170 A | 8/2000 | Sarbell | |
| 6,367,990 B1 | 4/2002 | Dumitriu | |
| 6,437,299 B1 * | 8/2002 | Watanabe et al. | 219/478 |
| 6,454,471 B1 * | 9/2002 | Ware | G02B 6/2558 385/99 |
| 6,519,395 B1 * | 2/2003 | Bevan et al. | 385/100 |
| 7,207,732 B2 * | 4/2007 | Fabian et al. | 385/99 |
| 7,364,375 B1 * | 4/2008 | Jones | 385/99 |
| 7,600,928 B2 * | 10/2009 | Rubinstein et al. | 385/99 |
| 7,699,540 B2 * | 4/2010 | Miyamori | G02B 6/2558 385/95 |
| 8,472,768 B2 * | 6/2013 | Kai et al. | 385/106 |
| 8,787,723 B2 * | 7/2014 | Makino et al. | 385/143 |
| 8,915,659 B2 * | 12/2014 | Marcouiller et al. | 385/99 |
| 9,004,781 B2 * | 4/2015 | Homma et al. | 385/99 |
| 9,052,459 B2 * | 6/2015 | Compton | G02B 6/2558 |
| 9,063,286 B2 * | 6/2015 | Durrant et al. | |
| 9,343,882 B2 * | 5/2016 | Kachmar | G02B 6/2558 |
| 2002/0110304 A1 * | 8/2002 | Werkheiser et al. | 385/8 |
| 2004/0048994 A1 * | 3/2004 | Rhodes et al. | 526/171 |
| 2009/0052846 A1 * | 2/2009 | Miyamori | G02B 6/2558 385/96 |
| 2011/0033161 A1 * | 2/2011 | Ochiai et al. | 385/124 |
| 2011/0188812 A1 * | 8/2011 | Han et al. | 385/77 |
| 2011/0280525 A1 * | 11/2011 | Marcouiller et al. | 385/99 |
| 2012/0170899 A1 * | 7/2012 | Homma et al. | 385/99 |
| 2014/0186312 A1 * | 7/2014 | Bettinger et al. | 424/93.7 |
| 2014/0355936 A1 * | 12/2014 | Bund et al. | 385/81 |
| 2014/0373962 A1 * | 12/2014 | Lamontia et al. | 138/125 |
| 2015/0160415 A1 * | 6/2015 | Lloyd et al. | |
| 2015/0185419 A1 * | 7/2015 | Kawanishi | G02B 6/2558 385/96 |

OTHER PUBLICATIONS

"Fiber Optic Construction Tool Kit FS-6500N", Oct. 7, 2013, http://www.fiberstore.com/fiber-optic-construction-tool-kit-fs-6500n-p-13698.html.

"Installation Guide", Oct. 7, 2013, http://www.timbercon.com/assets/Uploads/fiber-optic-cable-repair-kits/4-Fiber-Military-Cable-Installation-Guide.pdf.

* cited by examiner

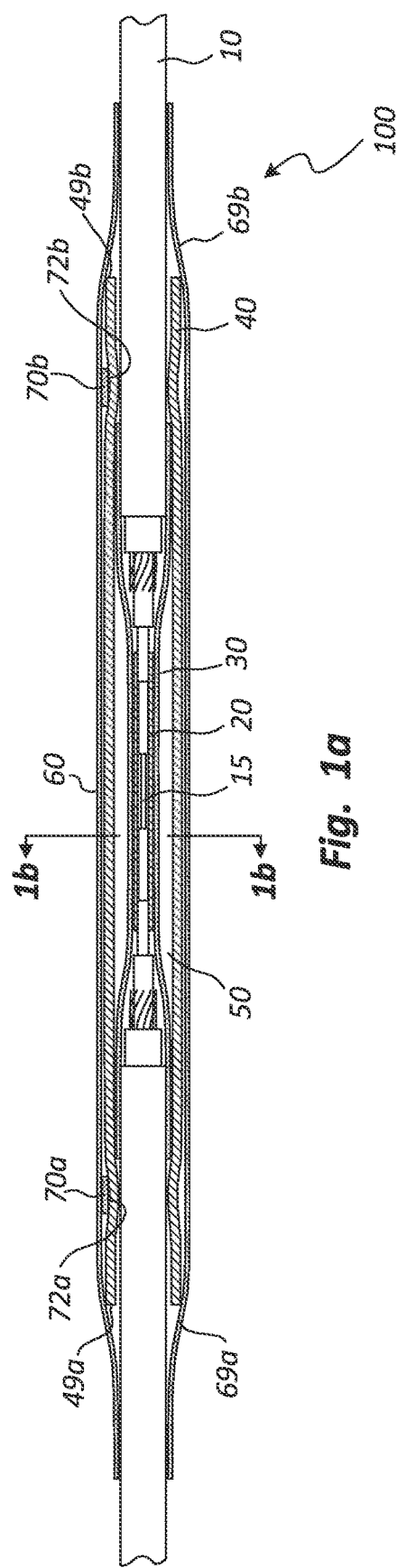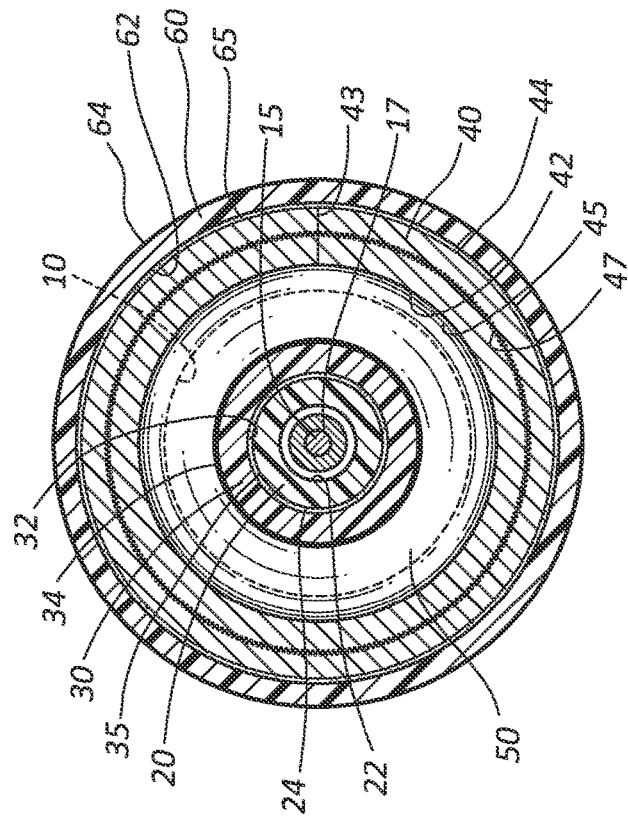

FLEXIBLE, LOW PROFILE KINK RESISTANT FIBER OPTIC SPLICE TENSION SLEEVE

FEDERALLY-SPONSORED RESEARCH AND DEVELOPMENT

This invention is assigned to the United States Government. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil. Reference Navy Case No. 102146.

BACKGROUND

1. Field

This invention relates to the field of optical waveguide repair, and more specifically, to a multi-layered apparatus and system for addressing structural differentials introduced when optical cables are spliced.

2. Background

Optical fiber cables, known for their high speed and bandwidth, are brittle glass or polymer fibers surrounded by a protective layer. Fiber optic cables can include large numbers of signal-carrying fibers, each fiber having a diameter of less than a human hair. The fiber-optic "bundle" is protected by an outer cable casing.

Fiber optic cables are often buried or submersed, and effectively under high pressure below ground or under water. They may need to be removed and redeployed which can include being rewound on reels. They may also be subjected to pulling forces ("tension") when the cable is being deployed.

The thin filament fibers within a cable may break when the outer housing of a cable is pierced, bent sharply ("kinked") or crushed. When a breakage in the fibers occurs, each fiber must be spliced back together. Two fiber segments are positioned end-to-end and heat fused to form a single optical fiber.

It is well known in the art that once the cable is repaired, the repaired cable is at a high risk of subsequent breakage due to several specific factors known in the art that contribute to this risk.

First, there is increased vulnerability because the original protective layers of the cable must be stripped during the repair process. It is a problem known the art that after a repair, when the structural layers are not restored, the cable is substantially weakened and does not have the same resistance to tension, bending or the original conditions which caused the cable to break prior to the repair.

Second, the splicing operation and/or makeshift strengthening and protecting measures result in geometric abnormalities and protuberances on the outer surface of cable which may cause the repaired cable to catch or snag objects moving across its surface. This may cause damage to the cable when moving or respooling.

Third, many repair processes result in rigid cable segments which are vulnerable to breakage because they cannot curve gently. This subjects the cable to kinking at a sharp angle at each end of the rigid segment.

Many attempts have been made in the prior art to reinforce fiber optic cable after a repair operation has been completed. For example, U.S. Pat. No. 5,884,003 A to Randy G. Cloud et al. (Cloud '003) teaches the use of a rigid case for enclosing and storing optical cable splices. While the Cloud '003 device may protect the splice, it creates problems associated with the storage and transportation of fiber optic cable. Use of this prior art device, and others like it, results in large, rigid segments of cable that cannot be easily wound on a spooling device for storage. Furthermore, the cable is vulnerable to kinking at each end of the rigid case.

Current repair methods and kits do not restore the structure of the original layers, focusing instead on providing a portable sleeve that can be used to rapidly cover the splice. The shrink-wrapped covering provides a simple mechanical interface but does not provide multiple layers of protection. Commercially available kits often comprise a single type of fusion splice sleeve for use after a fusion splicing operation. These kits may be a good on-site solution, but alone it has been shown in the art that they are inadequate to assure continued, reliable communications after a repair.

It is desirable to have a multi-layered splice protection apparatus or system which retains near to the original diameter of the cable, avoids creating a rigid segment, approaches the stiffness of the original cable, and continues to hold the same tension as the original cable in service.

SUMMARY OF THE INVENTION

This invention is a method and system for addressing structural weaknesses and geometric differentials introduced to a cable when splicing optic fibers. The apparatus and method for fiber optic cable repair utilize structurally integrated layers of protective polymers and bonding materials selected for strength and flexibility relative to their thickness. This results in an apparatus having a circumference that is minimally increased over that of the fiber optic cable. The method and apparatus include one or more polymer strengthening layers which allow the repaired cable sufficient flexibility, but prevent formation of sharp bends which are characteristic of spliced areas. The method and apparatus further include an outer layer having a geometric configuration which includes sloped terminating ends designed to prevent the reinforced area of the fiber optic cable from being damaged by the force of objects or substances in contact with cable.

BRIEF DESCRIPTION OF THE DRAWINGS

FIGS. 1a and 1b illustrate a side view and a cross-sectional view, respectively, of an exemplary layered optical fiber splice protection system.

TERMS OF ART

Figure 2A:
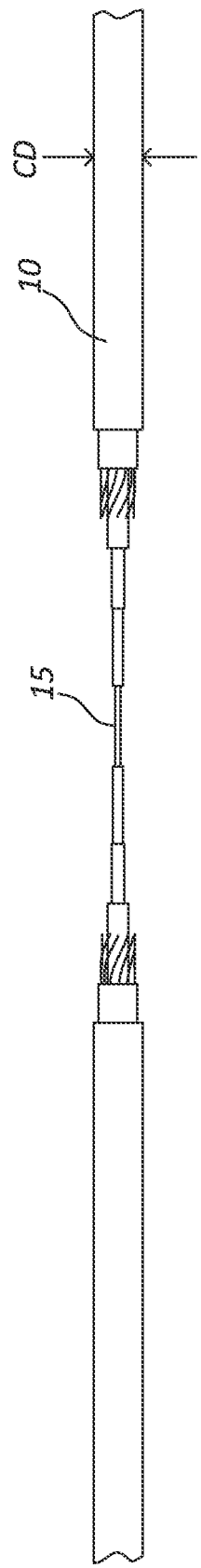
FIGS. 2a through 2e separately illustrate the structural properties of each layer of an exemplary layered optical fiber splice protection system.

As used herein, the term "bending modulus E" means a value of the tendency for a material to bend. Bending modulus is measured as force per unit area.

As used herein, the term "plurality" means a quantity of two or more.

As used herein, the term "tension modulus K" means a value of the maximum pulling force that a material can withstand before breaking. Tension modulus is measured as force per unit area.

As used herein, the term "substantially" means all or partially in a manner to effect function, operation or results.

DETAILED DESCRIPTION OF INVENTION

FIGS. 1a and 1b illustrate a side view and a cross-sectional view, respectively, of an exemplary layered optical fiber splice protection system.

The exemplary layered optical fiber splice protection system 100 of FIGS. 1a and 1b has an optical cable 10, an optical fiber 15 having an outer surface 17, a splice contact tube 20 with an inner surface 22 and an outer surface 24, a retaining tube 30 with a retaining tube inner surface 32, a retaining tube outer surface 34, and an adhesive moisture barrier layer 35, strengthening tube 40 with an internal tube surface 42, an optional longitudinal slit 43, an external tube surface 44, a tube adhesive layer 45, at least one structural reinforcement component 47 and first and second terminating outer rims 49a and 49b, an optional curable layer 50, an outer sleeve 60 with an internal sleeve surface 62, a tubular center section 64, a sleeve adhesive layer 65 and first and second sloped terminating ends 69a and 69b, and at least two optional securing components 70a and 70b each having an inner pressure surface 72a and 72b, respectively.

Figure 2B:
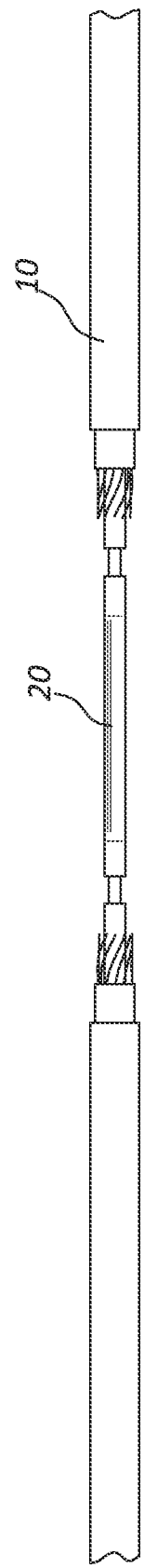
Figure 2C:
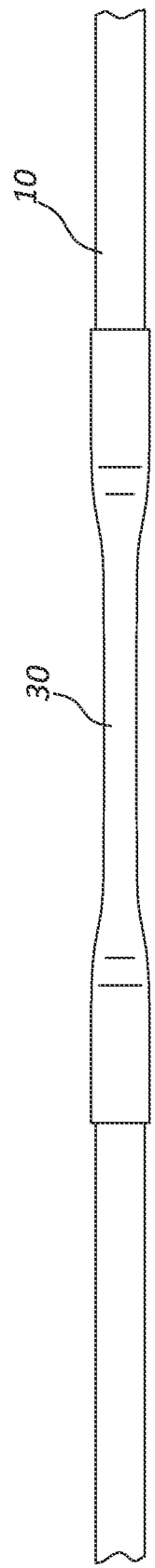

FIGS. 2a through 2c illustrate the structural alteration which occurs during each step of the prior art repair process. FIG. 2a shows the optical cable 10 having an external cable diameter CD. Optical cable 10 is made up of an optical fiber 15 typically surrounded by protective components such as cladding, a coating, a buffer, armored cladding, an aramid synthetic fiber sheath, or a cable jacket. During splicing, all of these protective components are stripped back from optical fiber 15 to permit performance of a splicing connection operation on optical fiber 15. FIG. 2b illustrates the structural properties of an exemplary first layer of an optical fiber splicing system. A reinforced splice contact tube 20 placed over the optical fiber 15 structurally conforms to the outer surface 17 of optical fiber 15. FIG. 2c illustrates the structural properties of an exemplary second layer of an optical fiber splicing system. Retaining tube 30 is located over the splice contact tube 20 and structurally conformed to the splice contact tube 20. An adhesive moisture barrier layer 35 disposed on the retaining tube inner surface 32 bonds with the outer surface 24 of splice contact tube 20 to prevent moisture intrusion (FIG. 1b). In various embodiments, splice contact tube 20 and retaining tube 30 may lack reinforcement or adhesive layers or have a reduced wall thickness. These alternate embodiments reduce the overall profile of the layered optical fiber splice protection system 100.

Figure 2D:
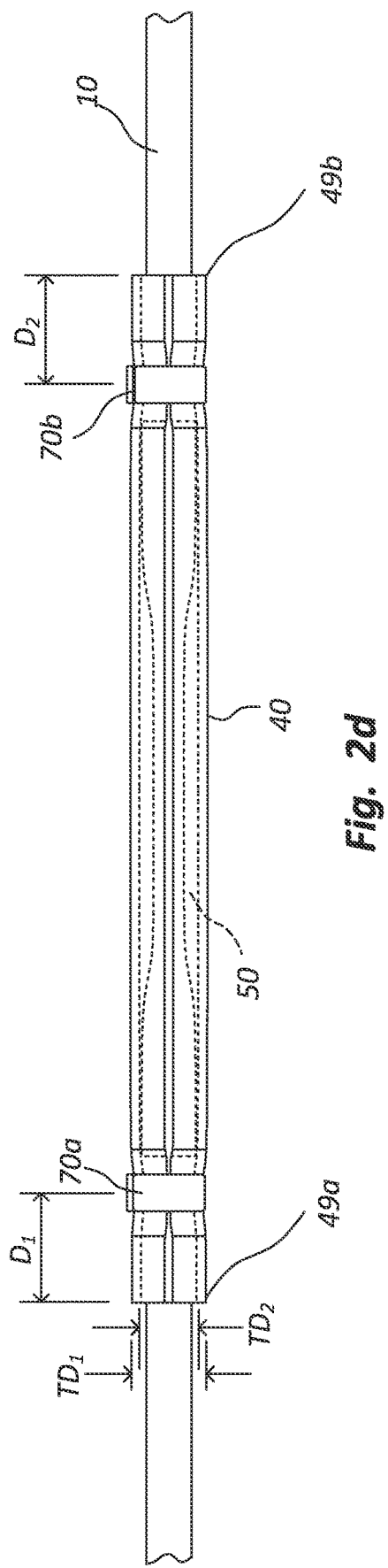

FIG. 2d illustrates the structural properties of an exemplary third protective layer of an optical fiber splice protection system. Strengthening tube 40 is located over retaining tube 30. Tube adhesive layer 45 (FIG. 1b) seals it to optical cable 10. Optional curable layer 50, injectable through the longitudinal slit 43 (FIG. 1b) into the volume between internal tube surface 42 and retaining tube 30, prevents kinking or splitting of the strengthening tube 40. Optionally, at least two securing components 70a and 70b clamp around strengthening tube 40.

Strengthening tube 40 is has an internal tube diameter $TD_1$ and an external tube diameter $TD_2$. Optionally, strengthening tube 40 has an embedded structural reinforcement component 47 (FIG. 1b). Strengthening tube 40 may also have a longitudinal slit 43 (FIG. 1b) for ease of application. The tube adhesive layer 45 on an internal tube surface 42 will adhere strengthening tube 40 to optical cable 10 and prevent strengthening tube 40 from splitting or slipping. Strengthening tube 40 is can be made from materials including, but not limited to polymers, natural or synthetic fiber braid, natural or synthetic rubber tubing, or other solid materials such as flexible metal tube, metal braid, or springs. Strengthening tube 40 may be a clear polymer to permit proper positioning of strengthening tube 40 and visualization of curable layer 50.

The internal tube diameter $TD_1$ of the strengthening tube 40 is greater than the external cable diameter CD of optical cable 10 to enable strengthening tube 40 to be applied around optical cable 10. The strength modulus $K_s$ of strengthening tube 40 is equal to or greater than the strength modulus $K_o$ of optical cable 10 along the axis of the cable. Thus, two or more of the optional securing components 70a and 70b will be required if the adhesive shear strength of the sleeve adhesive layer 45 is insufficient to carry the tension of optical cable 10. The bending modulus $E_s$ of strengthening tube 40 when added to the optical cable 10 is within about ten percent above or below the bending modulus $E_o$ of optical cable 10. This prevents excessive bending from being exerted on the optical fiber 15 and prevents optical cable 10 from kinking over first and second terminating outer rims 49a and 49b.

The structural reinforcement component 47 is an optional component which increases the tension modulus $K_s$ of strengthening tube 40. In embodiments where the tension modulus $K_s$ of strengthening tube 40 alone would not be a sufficient match to the tension modulus $K_o$ of optical cable 10, structural reinforcement component 47 can be utilized by strengthening tube 40. The structural reinforcement component 47 may be shaped as, but not limited to, at least one band, braid, helix, mesh, sheet or strip. The structural reinforcement component 47 (FIG. 1b) may be fabricated from materials such as, but not limited to, aramid, carbon, metallic and nylon materials.

Optional curable layer 50 may be, but is not limited to, a silicone, epoxy, silicone composite or epoxy composite material. Curable layer 50 is generally a fluid, injectable material which cures in situ to a solid to prevent kinking or splitting the strengthening tube 40.

The at least two optional securing components 70a and 70b may be, but are not limited to, a first ring-shaped pressure component 70a and a second ring-shaped pressure component 70b. These securing components 70a and 70b may be added in pairs placed a first distance $D_1$ and a second distance $D_2$, respectively, from the first and second terminating outer rims 49a and 49b. Respective inner pressure surfaces 72a and 72b (FIG. 1a) provide pressure on the strengthening tube 40 when applied.

Figure 2E:
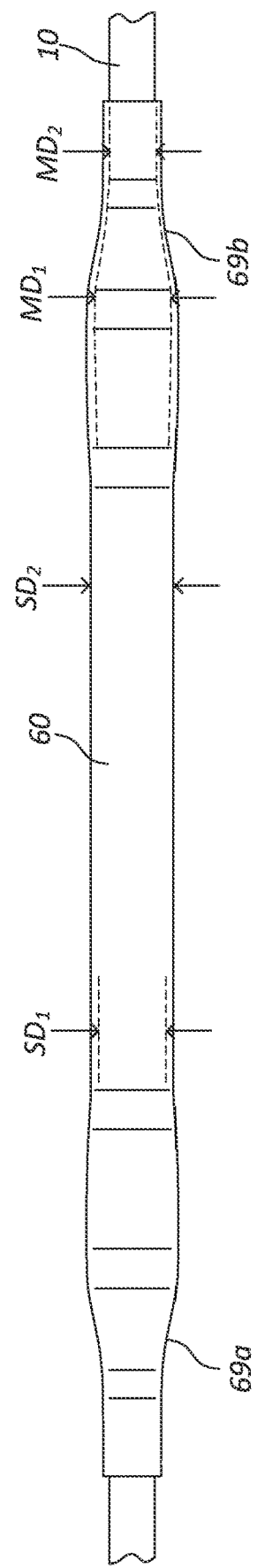

FIG. 2e illustrates the structural properties of an exemplary fourth layer of an optical fiber splice protection system. The outer sleeve 60 is located over strengthening tube 40 and sealed to strengthening tube 40 and optical cable 10. The sleeve adhesive layer 65 on internal sleeve surface 62 prevents outer sleeve 60 from slipping from position. Outer sleeve 60 has a strength modulus $K_c$ and a bending modulus $E_c$.

Outer sleeve 60 is fabricated from a heat-shrinkable material, a mechanically expanded polymer material which shrinks in one plane when heated. A tube of heat-shrinkable material shrinks in diameter when heated and activates sleeve adhesive layer 65 upon heating. Heat-shrinking outer sleeve 60 results in a tubular center section 64 having a first internal sleeve diameter $SD_1$ approximately equal to external tube diameter $TD_2$. Furthermore, first and second sloped terminating ends 69a and 69b have maximum internal diameters $MD_1$ approximately equal to internal diameter $SD_1$ which gradually slope down to minimum internal diameters $MD_2$ approximately equal to external cable diameter CD. This provides a smoother, more continuous surface over first and second terminating outer rims 49a and 49b of strengthening tube 40, preventing them from catching and causing damage to strengthening tube 40.

Outer sleeve 60 once installed may have an external sleeve diameter $SD_2$ in the range of about 10% to about 100% of the external cable diameter CD of optical cable 10. External sleeve diameter $SD_2$ must be minimized to prevent the outer diameter of system 100 from significantly exceeding the outer diameter of optical cable 10. Outer sleeve 60 substantially encloses strengthening tube 40.

In another exemplary embodiment of optical fiber splice protection system 100, the outer sleeve 60 is provided as a single unit layered with the strengthening tube 40. In this exemplary embodiment, both strengthening tube 40 and outer sleeve 60 are applied to optical cable 10 simultaneously. Heat-shrinking outer sleeve 60 simultaneously applies pressure to seal the tube adhesive layer 45 to optical cable 10.

In an alternate embodiment, outer sleeve 60 may be added directly over the optional curable layer 50 if its tension modulus $K_c$ and bending modulus $E_c$ are a sufficient match to the tension modulus $K_o$ and bending modulus $E_o$ of optical cable 10.

Figure 3:
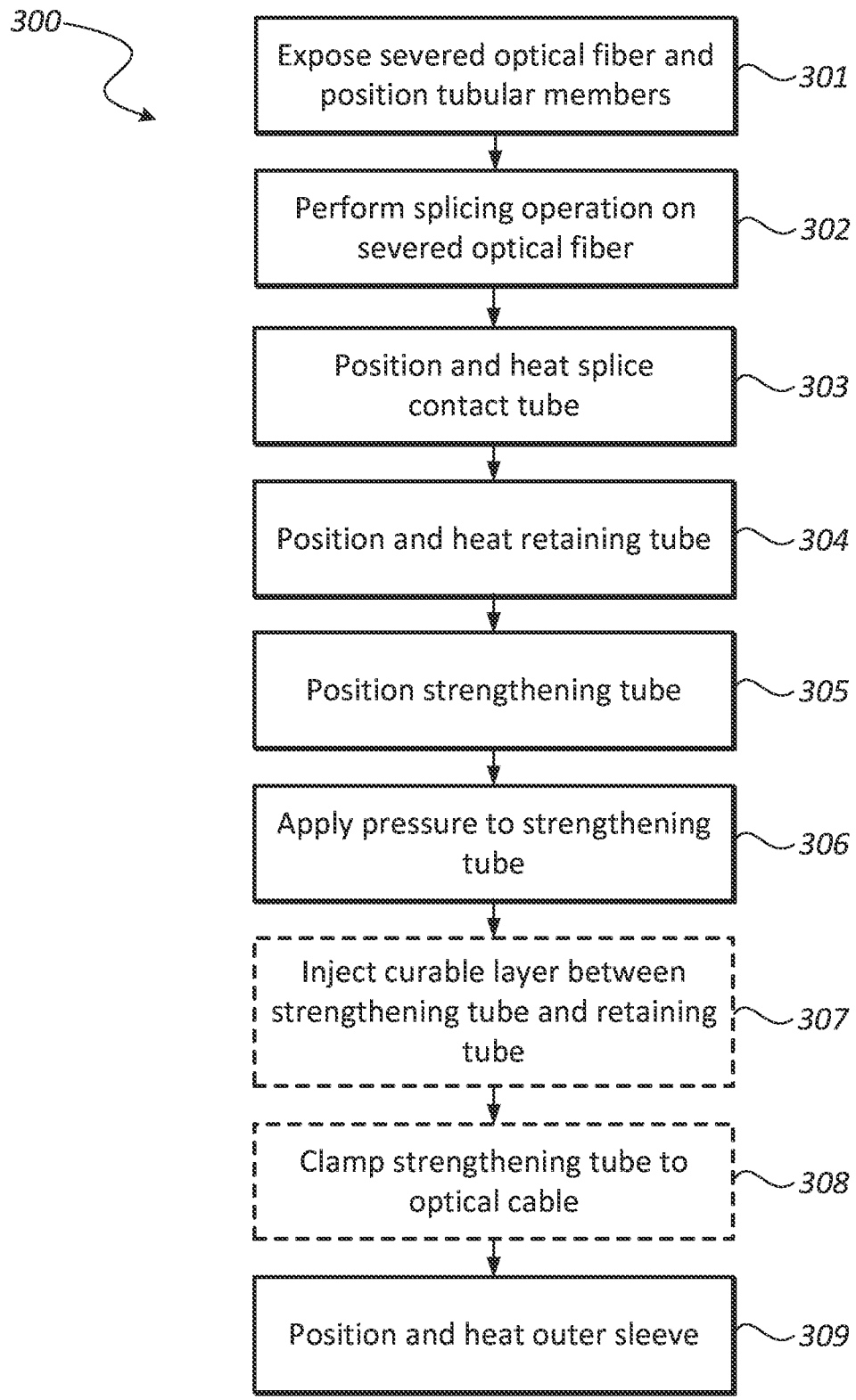
FIG. 3 illustrates an exemplary method for applying a layered optical fiber splice protection system.

FIG. 3 illustrates an exemplary method for applying a layered optical fiber splice protection system.

In Step 301, a user strips back protective components of optical cable 10 to expose the severed optical fiber 15 and positions the splice contact tube 20, retaining tube 30, strengthening tube 40 and outer sleeve 60 on optical cable 10. At Step 302, the user performs a splicing connection operation on optical fiber 15. At Step 303, the user positions the splice contact tube 20 over the now-spliced optical fiber 15 and shrinks splice contact tube 20 using applied heat. At Step 304, the user positions the retaining tube 30 over splice contact tube 20 and shrinks retaining tube 30 using applied heat. At Step 305, the user moves strengthening tube 40 over retaining tube 30. At Step 306, the user applies pressure to strengthening tube 40 to seal tube adhesive layer 45 to optical cable 10. At optional Step 307, the user injects curable layer 50 through the longitudinal slit 43 of strengthening tube 40 into a volume between internal tube surface 42 and retaining tube 30. At optional Step 308, the user clamps strengthening tube 40 to optical cable 10 with at least two securing components 70a and 70b. Finally, at Step 309, the user positions the outer sleeve 60 over strengthening tube 40 and shrinks outer sleeve 60 using applied heat.

It will be understood that many additional changes in the details, materials, steps and arrangement of parts, which have been herein described and illustrated to explain the nature of the invention, may be made by those skilled in the art within the principal and scope of the invention as expressed in the appended claims.

What is claimed is:

1. A multi-layered optical fiber splice protection apparatus, comprising:
   a strengthening tube over an optical fiber which has been spliced, said strengthening tube having an external tube surface with an external tube diameter and an internal tube surface with an internal tube diameter that is larger than an external cable diameter of an optical cable, and at least one structural reinforcement component embedded within said strengthening tube;
   said optical cable having a tension modulus $K_o$ and said strengthening tube having a tension modulus $K_s$ greater than or equal to $K_o$; and,
   said optical cable having a bending modulus $E_o$ and said strengthening tube having a bending modulus $E_s$ within a range of about ten percent above or below $E_o$.

2. The apparatus of claim 1:
   wherein a shape of said at least one structural reinforcement component is selected from the group consisting of band, braid, helix, mesh, sheet and strip; and,
   wherein a material of said at least one structural reinforcement component is selected from the group consisting of aramid, carbon, metallic and polymer materials.

* * * * *